No. 818,205. PATENTED APR. 17, 1906.
J. I. VAILE.
CART.
APPLICATION FILED MAY 22, 1905.

Witnesses:
O. M. Wennick
Carlos Escobar.

Inventor:
John I. Vaile
By Casper L. Redfield
Atty.

UNITED STATES PATENT OFFICE.

JOHN I. VAILE, OF RIVER FOREST, ILLINOIS.

CART.

No. 818,205.  Specification of Letters Patent.  Patented April 17, 1906.

Application filed May 22, 1905. Serial No. 261,506.

*To all whom it may concern:*

Be it known that I, JOHN I. VAILE, a citizen of the United States of America, and a resident of River Forest, in the county of Cook and State of Illinois, have invented certain new and useful Improvements in Carts, of which the following is a specification.

My invention relates to carts or sulkies, and has for its object improvements in such vehicles whereby they are made easier for the rider and are also made so that they are less liable to accidents.

Figure 1:
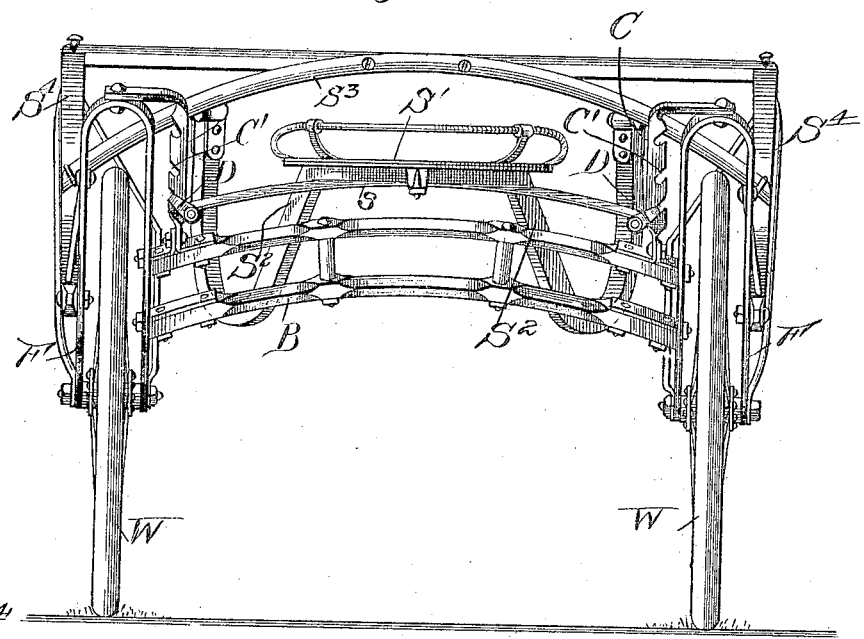
Figure 2:
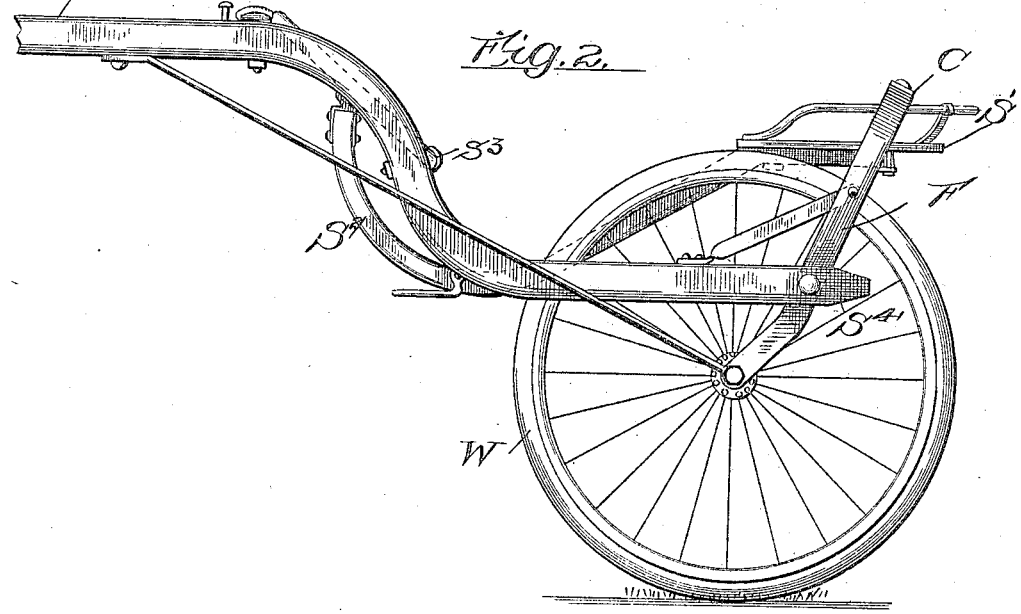

In the accompanying drawings, Figure 1 is a rear elevation of a cart, and Fig. 2 is a side elevation.

In the said drawings the wheels W are embraced by forks F, which carry the axles of the wheels. Between the two forks and connecting them together at about the vertical position shown in Fig. 1 is a bridge-tree B. Rising from the top of the bridge-tree B at each end is a bar or bracket C, having notches C'. Embracing each bracket C and adapted to engage a notch therein is a clevis-shaped piece D, and to the pins in these two pieces D is connected the spring S, which supports the seat S'. The seat S' is formed by or built on two bars $S^2$, which extend forward and are connected by a pivot to a cross-piece $S^3$, which cross-piece is supported by the shafts $S^4$.

The shafts bend downward just before they come to the wheels and are connected to the outside of the forks F a short distance above the axles of the wheels W. As a result of this construction the wheels are located between and are protected by the shafts, the shafts are connected to the forks at a short radius and below the seat, and the seat is located between and below the upper part of the forks.

The spring S and the clevis-shaped pieces D are so made that by raising by hand one end of the spring S the attached piece D can be freed from the notch C', in which it rests, and can then be dropped into another notch. By this means the seat can be raised and lowered to such position as the driver may desire.

For the purpose of giving a clear idea of the advantages of the construction shown a brief description will be given of the carts in ordinary use and the objections thereto.

The kind of cart herein referred to is the kind used by drivers for training or exercising trotting and pacing horses. Owing to the circumstances under which such training or exercising is done, there is great liability to collision either with other carts or with the fences surrounding the track.

As ordinarily made the shafts and the seat-supporting bridge are connected rigidly together as if of one piece, and the forks for the wheels take the form of brackets on the outside of the shafts. As a result of this it is quite possible for two drivers when passing each other in opposite directions to have the wheels or brackets on the two carts collide with each other, to the destruction of the carts and the injury of the drivers. By placing the forks inside of the shafts and then connecting these forks together by an independent bridge accidents of the kind described are completely avoided.

The driver who has a number of horses under his charge necessarily must ride a good many hours each day, and any unnecessary motion to the seat is fatiguing. As ordinarily made the shafts extend rearward to a point above the periphery of the wheels, where they bend downward to form the inside parts of the wheel-holding forks, and the shafts are connected together by a bridge located on a level or somewhat above the upper parts of the wheels. The seat is supported by a spring on this bridge and is connected to a cross-bar between the shafts. This makes a practically rigid connection between the seat and the shafts and supports the seat high above the axles of the wheels.

When a horse is trotting, the forward ends of the shafts move rapidly up and down. Owing to the practically rigid connection between the shafts and the seat, the seat partakes of the movement of the shafts and moves through a similar angle. The seat being far from the axle the length of the movement is comparatively great, and this movement being conveyed to the driver causes a continual strain upon his back.

In the construction which I have shown and described this strain upon the driver is greatly reduced. First, the seat much nearer the axle reduces the amplitude of the seat movement, and, second, the connection to the angular movement of the shafts is less rigid—that is, the connection is yielding and of the nature of a spring.

Placing the bridge B low in its connection with the forks F' makes it possible to bring the seat S' as low as it is practical to use it. Making the seat vertically adjustable makes it possible to vary the position of the seat to suit the circumstances. Thus when driving a small horse the seat may be at its lowest position, but when driving a tall horse one of the higher positions will be used.

The yielding nature of the connection to the shafts is partly due to the fact that the load (the seat with the driver on it) is out at the end of the lever formed by the fork F, while the connection for the shaft $S^4$ is near the fulcrum at the axle, and partly to the fact that the shaft has a reverse bend or curve near its connection to the fork F, which bend or curve will yield as a spring when subjected to strain.

What I claim is—

1. In a cart of the kind described, a pair of wheels, a fork for each wheel, shafts connected to said forks, a bridge connecting said forks together and located below the upper portions of said forks, bars connecting the bridge with the upper parts of the forks, and a seat adjustably supported on said bars.

2. In a cart of the kind described, the combination with the shafts, the wheels, the forks, and connections between the forks, of a spring-supported and vertically-adjustable seat located between the upper parts of said forks.

3. In a cart of the kind described, a pair of wheels, a fork for each wheel, a pair of shafts connected to the outside of the forks so that the forks will be located between the shafts, a bridge connected to the sides of the forks opposite the shaft connections and serving to connect the forks together, and a spring-supported seat carried by said bridge.

4. In a cart of the kind described, a pair of wheels, a fork for each wheel, a pair of shafts connected to the outside of the forks near the middle of the lengths thereof and so that the forks will be located between the shafts, a bridge connecting the forks together, and a seat supported by said bridge.

5. In a cart of the kind described, the combination with a pair of shafts, a bridge provided with connections to said shafts, and a pair of wheels placed between and protected by the shafts, of a seat located between the wheels at a normal elevation approximately on a level with the upper parts of the wheels, and means for adjusting the elevation of said seat.

6. In a cart of the kind described, the combination with a pair of wheels, and a fork for each wheel, of a pair of shafts extending outside of the wheels and connected to said forks at points close to but slightly above the axes of the wheels, a bridge connecting said forks and a seat supported between said forks and below the upper portions thereof.

Signed at Chicago, Illinois, this 19th day of May, 1905.

JOHN I. VAILE.

Witnesses:
R. L. BUCHANAN,
C. L. REDFIELD.